United States Patent
Vuong et al.

(10) Patent No.: US 8,765,231 B2
(45) Date of Patent: Jul. 1, 2014

(54) METHOD FOR ALIGNING NANOSTRUCTURES

(71) Applicant: Research Foundation of the City University of New York, New York, NY (US)

(72) Inventors: Luat T. Vuong, New York, NY (US); Matthew Moocarme, Brooklyn, NY (US)

(73) Assignee: Research Foundation of the City University of New York, New York, NY (US)

( * ) Notice: Subject to any disclaimer, the term of this patent is extended or adjusted under 35 U.S.C. 154(b) by 0 days.

(21) Appl. No.: 13/889,326

(22) Filed: May 7, 2013

(65) Prior Publication Data

US 2013/0316090 A1 Nov. 28, 2013

Related U.S. Application Data

(60) Provisional application No. 61/643,655, filed on May 7, 2012.

(51) Int. Cl.
*B05D 3/00* (2006.01)
*H01F 1/00* (2006.01)
*B82B 3/00* (2006.01)
*B05D 3/06* (2006.01)

(52) U.S. Cl.
CPC . *B05D 3/207* (2013.01); *B05D 3/06* (2013.01); *H01F 1/00* (2013.01); *B82B 3/00* (2013.01)
USPC .......................................................... 427/547

(58) Field of Classification Search
USPC .................................................. 427/550, 547
See application file for complete search history.

(56) References Cited

U.S. PATENT DOCUMENTS 3,267,360 A * 8/1966 Dehmelt ........................ 324/304
6,200,651 B1 * 3/2001 Roche et al. .................. 427/571

* cited by examiner

*Primary Examiner* — Nathan Empie
*Assistant Examiner* — Tabassom Tadayyon Eslami
(74) *Attorney, Agent, or Firm* — Hiscock & Barclay, LLP

(57) ABSTRACT

Disclosed in this specification is a method for aligning nanostructures. A substrate is coated with a liquid solution comprising particles. Before the solution is cured, circularly-polarized light is applied to the substrate to induce a magnetic field in the particles. A low strength magnetic field is then applied. The induced magnetic field of the particles aligns with the applied magnetic field. The solution is permitted to cure while simultaneously exposed to both the circularly-polarized light and the applied magnetic field. The resulting composite retains the particle alignment.

20 Claims, 6 Drawing Sheets

FIG. 1A  FIG. 1B

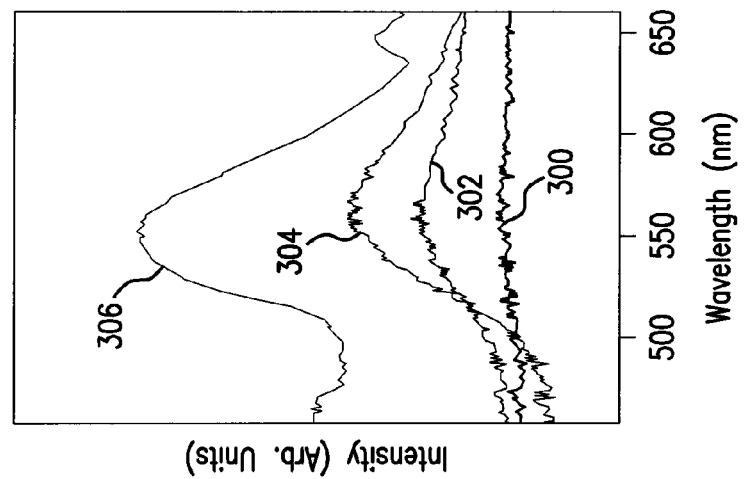
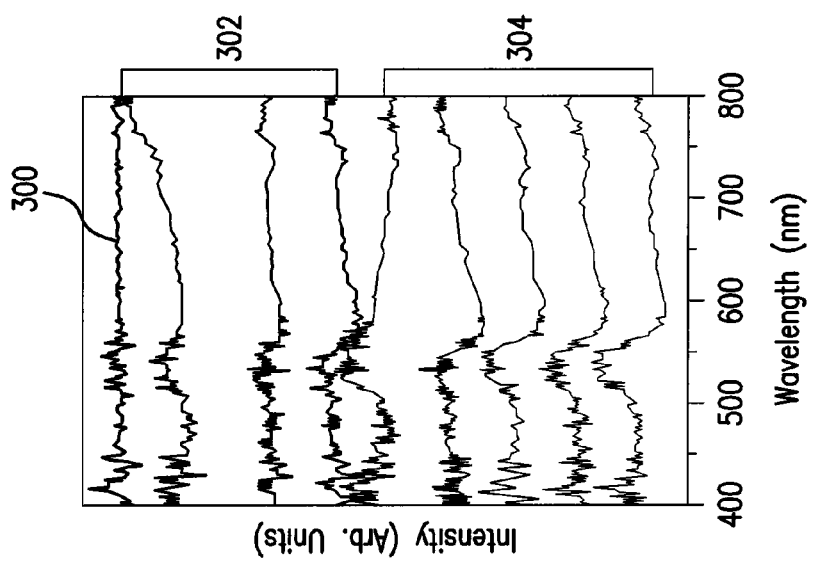
FIG. 3B
FIG. 3A

METHOD FOR ALIGNING NANOSTRUCTURES

CROSS-REFERENCE TO RELATED APPLICATIONS

This application claims priority to U.S. provisional patent application Ser. No. 61/643,655 (filed May 7, 2012), which application is incorporated herein by reference in its entirety.

FIELD OF THE INVENTION

This invention relates, in one embodiment, to a method for aligning and building nanostructures and microstructures using low intensity circularly-polarized light and a mild applied magnetic field. The aligned nanostructures are useful for forming structured composite materials.

BACKGROUND

Nano-engineered materials are conventionally made using a variety of labor-intensive and expensive processes. For example, complexes layering, masking and laser lithography techniques are commonly employed to produce nanostructures that are properly aligned. These techniques each have drawbacks including lack of scalability and expense. It would be desirable to provide an alternative method to engineer such materials.

SUMMARY OF THE INVENTION

Disclosed in this specification is a method for aligning and building nanostructures. A substrate is coated with a liquid solution comprising particles or a liquid volume is employed. Circularly-polarized light is applied to the sample to photo-induce a magnetic response in the particles. A low strength magnetic field is then applied. The induced magnetization of the particles aligns with the applied magnetic field. The solution is permitted to cure, melt, or assemble while simultaneously influenced by both the circularly-polarized light and the applied magnetic field. The illumination intensity of light and applied magnetic fields are permitted to change in time. The resulting composite retains memory of the method of processing in the particle alignment and organization.

BRIEF DESCRIPTION OF THE DRAWINGS

The present invention is disclosed with reference to the accompanying drawings, wherein:

FIG. 1A to FIG. 1C are process diagrams of an exemplary process for forming a nanocomposite;

FIG. 2A is a schematic depiction of an exemplary apparatus for curing a nanocomposite while

FIG. 3A shows minute-lapsed measurements when samples are illuminated with unpolarized light while FIG. 3B shows the stabilized scattered spectra when sample solutions are illuminated with circularly-polarized light;

FIG. 5A shows relative change in magnetization of a dimer nanocluster as a function of angle with incident electric field while

FIG. 6A shows 80 nm gold nanoparticles while FIG. 6B shows seed formation of nanodendritic structures under illumination of circularly polarized light with a seeded magnetic field while FIG. 6C shows the growth of nanodendritic structures and FIG. 6D shows typical nanodendritic structure after 1 hour of illumination.

Corresponding reference characters indicate corresponding parts throughout the several views. The examples set out herein illustrate several embodiments of the invention but should not be construed as limiting the scope of the invention in any manner.

DETAILED DESCRIPTION

Disclosed in this specification is a solution-processed nanocomposite that uses circularly-polarized and an applied magnetic field to align particles. The circularly-polarized light may be of sunlight intensity (e.g. 1 mW per square centimeter to 2 W per square centimeter). The applied magnetic field may be of low intensity (e.g. 1 microtesla to 900 millitensa). A distinct advantage is the solution-processed nature that permits assembly on-demand and the employment of broadband incoherent light sources.

Referring to FIG. 1A, a solution 100 is painted or otherwise deposited onto a surface. This solution contains small particles (e.g. 5 nm to 3 microns). In one embodiment, the particles are chiral molecules or nanoparticles (e.g. 5 nm to 200 nm) or other substances with finite charge mobility. In one embodiment, the nanoparticle is an 80 nm gold nanosphere sold under the brand name NANOXACT™ from Nanocomposix. The particles are dissolved or suspended in a liquid. In one embodiment, the liquid is selected to have hydroxyl groups. Without wishing to be bound to any particular theory, it is believed hydroxyl groups facilitate the dissipation of heat for certain embodiments. In one such embodiment, the liquid is water. In another embodiment, the liquid comprises a conductive polymer such as poly(3,4-ethylenedioxythiophene. A variety of concentrations may be prepared. For example, a dilute solution of 0.1 to 0.001 mg of nanoparticles per mL of solution may be used. Other concentrations are also contemplated and are considered within the scope of this disclosure.

Figure 1C:
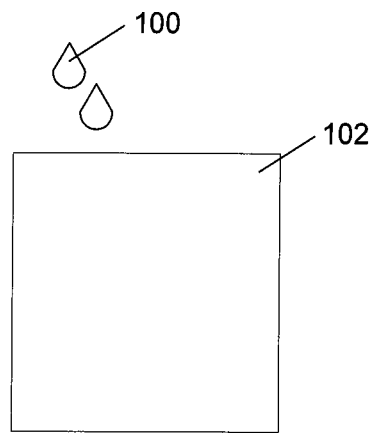
Figure 1C:
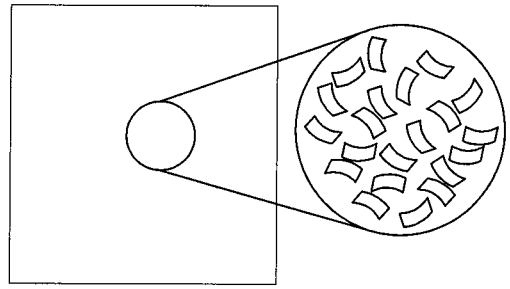
Figure 1C:
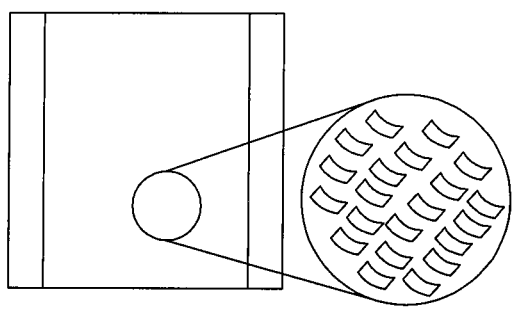

In FIG. 1B, the solution is cured or hardened during which both a circularly-polarized light and an applied magnetic field is utilized on the substrate. When each molecular or nanoparticle absorbs light, it forms dipole with positive and negative charges, depending on the orientation and circular polarization handedness. The molecular and/or nanoparticles align the dipole with the applied electric field or voltage while the composite cures. In FIG. 1C, the material has solidified and the particles remain aligned. The exemplary embodiments disclosed elsewhere in this specification show the alignment of the particles is retained.

Without wishing to be bound to any particular theory, an explanation is provided as follows. When light illuminates metallic sub-wavelength structures, vortex energy flows and phase singularities are produced. The associated whirlpool energy flows manifest near sharp edges and the hydrodynamic effects and the dynamics are strongly coupled to surface plasmons. Such coiled electron currents and vortex energy flows give rise to magnetic fields and an appreciable photo-induced magnetic response occurs via the excitation of plasmons on metallic sub-wavelength structures. Our understanding of the photo-induced plasmon dynamics underpins the design of electromagnetic metamaterials and aids in the development of new photo-catalytic materials, photovoltaic devices, and sensors.

Optical vortex dynamics and plasmon-induced magnetic fields characterize the energy flow in nanostructured geometries. In prior research, a magnetic resonance arises due to the ring-shaped arrangement of nanoparticles when each individual particle dipole is oriented in the azimuthal direction. Although the presence of phase vortices and phase singularities is not explicitly stated, singularities are present in the resonance mode; placement of a nanoparticle where the phase is undefined removes the magnetic resonance. From another perspective, the phase vortices in the scattered electromagnetic fields, which are coupled to the surface waves, reveal that the spin angular momentum of incident circularly-polarized light excites plasmons with orbital angular momentum via scattering.

Although the control of plasmon angular momenta and the subsequent magnetic fields is possible via the design of the illuminating polarization and illuminated nanostructure, the dynamics have been shown to be highly nonlinear. Within the ring-arrangement of nanoparticles, the electric and magnetic plasmon resonances are coupled and highly dependent on the uniform spacing between particles. Near a plasmon resonance, small changes in the boundary conditions lead to sharp changes in the Poynting vector and in fact, opposite vortex energy flows are predicted above and below a plasmon resonance. Future metamaterials will reliably control or leverage these nonlinear plasmon vortex dynamics, which are the focus of this report.

In an exemplary embodiment, this disclosure demonstrates an anomalously-large sustained response to DC magnetic fields from solutions of gold nanospheres, where our samples retain memory of the applied DC magnetic fields. The photo-induced magnetic response is associated with a photo-induced drift, photo-galvanic, or photon drag effect, which leads to the production of magnetic fields and a measurable inverse Faraday effect. The transfer of momentum from photon to electron has the signature of being polarization-dependent. Subsequently and crucially, the nonlinear vortex flows that reverse direction with incident circular polarization handedness cannot be numerically simulated by assuming a linear superposition of orthogonal linear polarizations. Another distinction is that these polarization-dependent vortex dynamics do not flip direction with wavelength "detuning" at the plasmonic resonance. This nondispersive behavior, in addition to the anomalously-large sustained response, may lead to robust self-assembly dynamics for broad-band photonics applications.

The scattered light spectra was measured before and after applying DC magnetic fields and show consistent changes in the scattering intensity—at times, as much as 20%. We observe enhanced scattering at the plasmon absorption wavelengths when samples are simultaneously illuminated with light while applying DC external magnetic fields and increased Fano-like resonances when the DC magnetic field is removed. The magnetic response occurs on minute-time scales and is concentration-dependent. Interference fringes indicate that the samples remain non-aggregated and as individual nanoparticles, which is important because the majority of prior work addresses the appreciable photo-induced magnetic response of aggregated clusters of nanoparticles. What we observe is not explained entirely by the individual nanoparticle plasmonic response either, which is both too small to observe at room temperatures and decreases too rapidly with distance from the nanoparticle to significantly influence adjacent nanoparticles. Although enhanced via multiple scatterings, the photo-induced magnetic response studied here is sustained by disperse nanoparticle interactions.

The photo-induced magnetic response is particularly remarkable given the low particle fill-factor of our solution samples the unprecedented low illumination intensities (<1 W per square cm), and the use of incoherent unpolarized light from a broad-band lamp or solar simulator in our experiments. Our results indicate that 1) the surrounding aqueous solution plays a strong role in the collective dynamics, 2) the interaction between particles is non-negligible, 3) there is a coherent nanoparticle response between adjacent nanoparticles, which leads to 4) a cumulative effect in multiple scatterings.

Exemplary Experimental Setup and Results

Figure 2A:
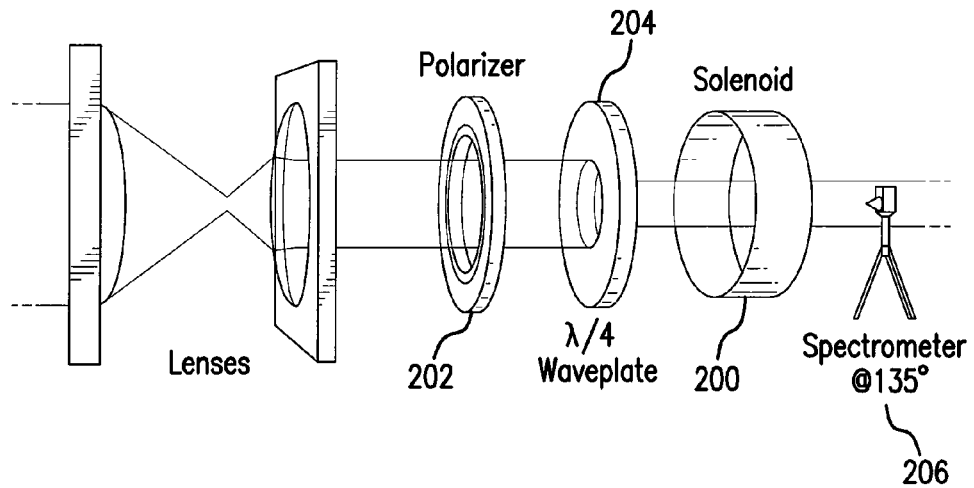
Figure 2B:
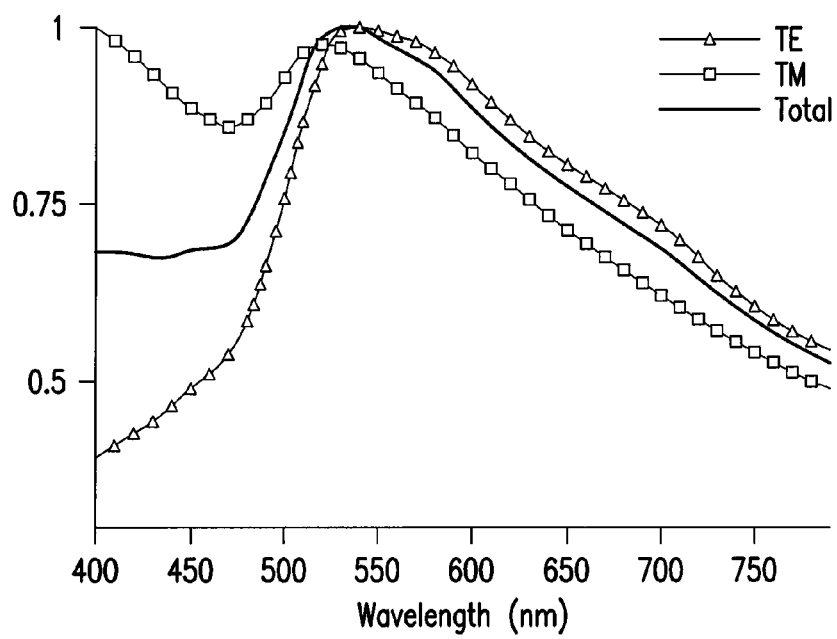
FIG. 2B is a graph depicting scattering associated with the nanoparticles.

Our experimental setup is shown in FIG. 2A. Light from a 150-W halogen-xenon lamp is collimated onto sealed 2.5 cm-diameter samples containing dispersed polyvinylpyrrolidone (PVP)-coated 80 nm-diameter gold nanospheres in aqueous solution (NanoXact from Nanocomposix). The lamp intensity is less than 1 W per square cm at the sample. The sample containers sit at the center of a solenoid 200 whose axis is aligned with the incident lamp light. A visible-wavelength antireflection-coated polarizer 200 and achromatic waveplate 204 are placed to control the incident polarization. A fiber-coupled spectrometer 206 measures the scattered light spectra at approximately 135° from the incident angle. The gold nanospheres have a total extinction spectra similar to that shown in FIG. 2B, calculated using Mie theory. FIG. 2B also shows the computed normalized scattering cross-section associated with the transverse electric (TE) and magnetic (TM) modes.

Within thirty minutes of placing the container in the collimated beam, the scattering spectra stabilizes and we observe <0.3% variation between minute-lapsed measurements. We use this stabilized spectrum as the reference for subsequent measurements. FIG. 3A shows minute-lapsed measurements (from the top, offset 0.015/measurement) when samples are illuminated with unpolarized light using 0.05 mg per mL solutions. The scattered spectra stabilizes along the timescale of minutes and changes by as much as 4% after application of the magnetic field. FIG. 3B shows the stabilized scattered spectra when 0.05 mg per mL sample solutions are illuminated with circularly-polarized light. The curves show the relative scattering before, during, and after a 1.5 mT magnetic field is applied, as well as the subsequent scattered spectra when the quarter waveplate is rotated to align its fast optical axis with the polarizer, producing linearly-polarized light angled 45° to the plane of incidence. In FIG. 3A and FIG. 3B, the effect of an external DC magnetic field on the scattering spectra of 80 nm diameter gold nanocolloids in aqueous solution. Before application of the magnetic field, the spectra varies less than 0.3% between minute-lapsed measurements (300). During the application of a 1.5 mT DC magnetic field, there is an increase at the plasomon resonance (302). After the magnetic field is removed the scattered spectra shifts but maintains robust memory of the magnetic field (304). The scattered spectra broadens when the incident light is subsequently changed to linear polarization (306).

At this sample concentration, when light is incident and an external magnetic field is applied, the scattering spectra increases at the Plasmon resonance wavelength $\lambda=546$ nm. The charge in spectra occurs with both polarized and unpolarized light and we associate the response with the excitation of surface plasmons. The relative scattering intensity increases 6.4% with circularly-polarized light and increases to 20% after a magnetic field is applied while the sample is illuminated with linearly-polarized light. The spectrum is notably twice as broad with linearly polarized light than with circularly-polarized light. The measured changes in the scattering spectra are stable and repeatable, showing memory of and are sustained by, light after removal of the magnetic field.

In all experiments we confirm two things: that the magnetic response is photo-induced (when the magnetic field is applied and the light is instead simultaneously blocked for one minute, there is no appreciable change in the scattered spectra) and that the change is sustained (particles showed no induction of re-alignment even after several hours).

Figure 4:
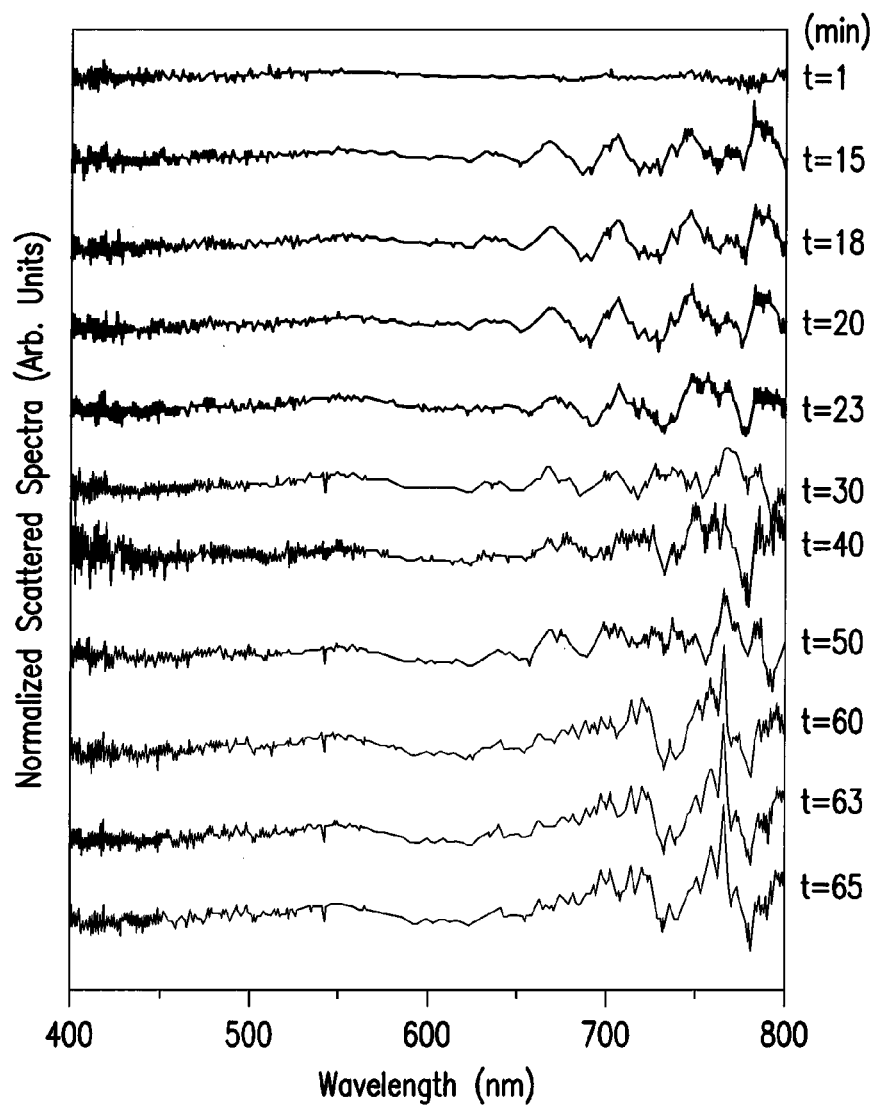
FIG. 4 shows changes in the scattering spectra relative to the initial time when the sample is illuminated with circularly-polarized light.

The measured photo-induced magnetic response depends on the concentration of the dispersed gold nanocolloid solution. Using diluted 0.025 mg per mL samples, the change in the scattering is more pronounced at longer wavelengths. In FIG. 4 we monitor changes in the scattering spectra relative to the initial time $t_{abs}=0$ min when the sample is illuminated with circularly-polarized light. The samples settle within 28 minutes and between time $t_{abs}=28$-$35$ min, an electrical current is applied to the solenoid, again producing a 1.5 mT magnetic field in the longitudinal direction.

Before applying a magnetic field, the system exhibits interference fringes indicative of a locally-periodic structure. If we attribute these fringes to the scattered-field interference between adjacent particles, then the distance between particles in our solution is calculated to be 12 micrometers, in agreement with our nanoparticle samples. During the application of the electrical current to the solenoid, the fringes in the spectra are disturbed. However, after removing the magnetic field, we measure distinct, asymmetric, Fano-like changes in the spectra, which point to the coupling between the incident and scattered fields. While the periodic patterns of quasi-crystallized metal nanoparticles have been studied, to the best of our knowledge, the quasi-crystallization of such disperse nanocolloids has not yet been observed.

Analysis of Scattering Due to Orbital Surface Currents

Here, we show that the inclusion of the DC orbital charge density currents yields Mie solutions with modified anisotropic coefficients and a corresponding increase in the effective metal conductivity. We use the notation for the time-varying current density $$\tilde{J} = q\tilde{n}\tilde{v} = J_0 + J_1 e^{i\omega t} + c.c., \quad (1)$$

where $q$ is the electron charge, and the time-varying charge density $\tilde{n} = n_0 + n_1 e^{i\omega t} + c.c.$ and velocity $\tilde{v} = v_0 + v_1 e^{i\omega t} + c.c.$ are related by the continuity equation:

$$\partial \tilde{n}/\partial t + \nabla \cdot (\tilde{v}\tilde{n}) = 0.$$

However, we do not assume that the time-averaged velocity $V_0$ is zero; in fact, we assert that the orbital DC currents manifest in the optical scattering as a signature of the photo-induced magnetic fields measured here. The incident circularly-polarized plane wave in spherical coordinates is $$E_{i,r} = \frac{1}{(k_b r)^2} \sum_{l=1}^{\infty} i^{l-1}(2l+1)\psi_l(k_b r) P_l(\cos\theta)(e^{\pm i\phi}), \quad (2)$$

$$E_{i,\theta} = \frac{1}{k_b r} \sum_{l=1}^{\infty} i^l (2l+1)\psi_l(k_b r) P_l(\cos\theta)\cos\theta(e^{\pm i\phi}),$$

$$E_{i,\phi} = \frac{\pm 1}{k_b r} \sum_{l=1}^{\infty} i^{l+1}(2l+1)\psi_l(k_b r) P_l(\cos\theta)(e^{\pm i\phi}),$$

where $k_b = 2\pi\sqrt{\epsilon^b}/\lambda$ is the wavenumber, $\lambda$ is the wavelength, $\epsilon^b$ is the permittivity of the material surrounding the conducting sphere, and the $\pm$ sign determines the orthogonal polarization handedness of the circularly-polarized light. The polarization-dependent geometric phase $\exp(\pm i\phi)$ gives rise to polarization-dependent vortex flows in the scattered fields. Substituting the modified relation for the current density [Eq. 1] into Mie's solution with incident circularly-polarized light, the scattered electric fields remain $$E_{s,r} = \frac{e^{\pm i\phi}}{(k_b r)^2} \sum_{l=1}^{\infty} l(l+1)^{TM} B_l \xi_l(k_b r) P_l(\cos\theta), \quad (3)$$

$$E_{s,\theta} = \frac{-e^{\pm i\phi}}{k_b r \sin\theta} \sum_{l=1}^{\infty} {}^{TM}B_l \xi_l'(k_b r) P_l'(\cos\theta)\sin^2\theta - i^{TE}B_l \xi_l(k_b r) P_l(\cos\theta),$$

$$E_{s,\phi} = \frac{\pm i e^{\pm i\phi}}{k_b r \sin\theta} \sum_{l=1}^{\infty} {}^{TM}B_l \xi_l'(k_b r) P_l(\cos\theta) - i^{TE}B_l \xi_l(k_b r) P_l'(\cos\theta)\sin^2\theta,$$

where $P_l$ is the first associated Legendre polynomial of order 1, $\xi$ is the Riccati-Hankel function of the first kind, and ' denotes differentiation with respect to the argument. The coefficients $^{TE}B$ and $^{TM}B$ are determined by the TE and TM boundary conditions of the problem, respectively $$^{TM}B_l = \frac{i^{l+1}(2l+1)}{l(l+1)} \frac{k^a k_2^b \psi_l(k^a a)\psi_l'(k^b a) - k_2^a k^b \psi_l'(k^a a)\psi_l(k^b a)}{k_2^b k^a \psi_l(k^a a)\zeta_l'(k^b a) - k^b k_2^a \zeta_l(k^b a)\psi_l'(k^a a)} \quad (4)$$

$$^{TE}B_l = \frac{i^{l+1}(2l+1)}{l(l+1)} \frac{k^a k_2^b \psi_l(k^a a)\psi_l'(k^a a) - k_2^a k^b \psi_l(k^a a)\psi_l'(k^b a)}{k_2^b k^a \zeta_l(k^b a)\psi_l'(k^a a) - k^b k_2^a \psi_l(k^a a)\zeta_l'(k^b a)}$$

where $$k_2^b = k_2^a = i\frac{2\pi}{\lambda} \quad \text{and} \quad k^a = \frac{2\pi}{\lambda}\sqrt{\epsilon^a + \frac{4\pi\sigma}{\omega}} a$$

for a non-magnetic sphere, where $\epsilon$ is the permittivity and $\sigma$ is the specific conductivity. The superscripts (a) and (b) identify the conducting sphere and the surrounding material, respectively.

By including the relation for J [Eq. 1] in Maxwell's equations, we see that loops of azimuthal electrical currents and nonzero $V_0$ on the surface of the nanoparticles lead to modified, anisotropic coefficients for $k^a$. If we assume that $v_0 = v_0 \hat{\phi}$, then the corresponding conductivity tensor $aJ,k$ becomes $$\sigma_{r,r} = \frac{(v_1 \cdot \hat{r} n_0)q}{E_1 \cdot \hat{r}}, \quad (5)$$

$$\sigma_{\theta,\theta} = \frac{(v_1 \cdot \hat{\partial} n_0)q}{E_1 \cdot \hat{\theta}}, \quad (6)$$

$$\sigma_{\phi,\phi} = \frac{(v_1 \cdot \hat{\phi} n_0 + v_0 n_1)q}{E_1 \cdot \hat{\phi}}. \quad (7)$$

The conductivity tensor increases anisotropically due to the existence of surface current loops. We have not provided a closed solution to the analytical scattering problem, however our claim of modified Mie coefficients and an anisotropic conductivity tensor agrees with our experimental measurements. During and after an applied magnetic field, relative changes in the scattering spectra resemble the total scattering spectra. We assert that the applied external magnetic fields in our experiments align the orbital motion of plasmons or electric surface current loops on the nanoparticles, effectively aligning the plasmon-induced magnetic moment of each nanoparticle. The ensemble of nanoparticles undergoes a ferromagnetic transition and maintains memory of the applied magnetic field. Changes in the electron-electron scattering lifetime are expected. In the next section, we will illustrate the nanoparticle magnetization that occurs as a result of the DC orbital electrical surface currents and elaborate on the nanocomposite magnetization.

Nonlinear Magnetization $M_{nl}$

Here, we evaluate the first-order correction of the nonlinear magnetization of a non-ferromagnetic nanosphere, which we evaluate using the incident and Mie-scattered electric fields. We illustrate how a single metallic nanoparticle and its surrounding matrix is magnetized when illuminated with circularly-polarized light and show how the magnetization changes after applying DC magnetic fields in the z-direction. Our analysis supports our assertion that the orbital motion of surface plasmons, which here is directed in the azimuthal direction when excited by circularly-polarized light, produces a DC nanoparticle magnetization. Our nanocolloid samples achieve a sustained local order as a result. Finally, we show how the application of a DC magnetic field selectively couples the incident fields with the TM-scattered electric fields, which are associated with surface plasmons.

A tractable analytic expression can be derived for the DC or low-frequency nonlinear magnetization $M_{nl}$ from the nonlinear current density $J_{nl}(r,t) = \nabla \times M_{nl}$, where $$J_{nl} \propto [i(\nabla \cdot E^*)E + c.c.] \tag{8}$$

$$= i[(\nabla \cdot E^*)E - c.c.] \tag{9}$$

$$= i\nabla \times (E \times E^*) + i[(E \cdot \nabla)E^* - (E^* \cdot \nabla)E]. \tag{10}$$

Equation 8 points to the source of $J_{nl}$: the evanescent electric fields associated with the oscillating surface charge density. Even when there are no free charges, $J_{nl}$ is nonzero because $\nabla \cdot E \neq 0$. By evaluating individual terms numerically, we observe that the right square-bracketed term of Eq. 10, which is associated with a ponderomotive force, has a significantly weaker contribution compared to the first term, from which Hertel extracts the plasmon-induced magnetization, $$M_{nl} \propto i(E \times E^*), \tag{11}$$

where E is the total electric field. We evaluate Eq. 11 using the incident $E_i = (E_{i,r}, E_{i,\theta}, E_{i,\phi})$ [Eq. 12] and scattered $E_s = (E_{s,r}, E_{s,\theta}, E_{s,\phi})$ [Eq. 3] electric fields, i.e., $$M_{nl} \propto i(E_s \times E^*_s + E_i \times E^*_s + E_s \times E^*_i), \tag{12}$$

and where $E_u \times E^*_i$ is neglected because it is constant-valued and therefore does not contribute to $J_{nl}$. The evaluation of Eq. 12 yields a pure real-valued numerical result, which represents the first-order non-zero nonlinear DC correction to Maxwell's equations. In our experiments prior to the application of a magnetic field, we observe the interference fringes from a locally-periodic structure, which may arise in part due to this photo-induced magnetization of nanoparticles.

When the incident circular-polarization handedness changes, the polarity of the nonlinear magnetization flips sign. The longitudinal magnetization, $$M_{nl,z} = \cos(\theta) M_{nl,r} - \sin(\theta) M_{nl,\theta}, \tag{13}$$

is polarization-dependent while in contrast, the direction of the azimuthal magnetization $M_{nl,\phi}$ is not polarization-dependent. The vortex energy flows associated with the azimuthal magnetization receive considerable attention but carry a smaller role with the nonlinear response that is studied here. In comparison with where the vortex flows associated with the azimuthal magnetization reverse direction at the plasmon resonance wavelength, we find that the longitudinal nonlinear magnetization and associated vortex flows maintain the same polarity across wavelengths; there is qualitatively little change in the nonlinear magnetization as a function of wavelength. Instead, the strength of the nonlinear magnetization is larger at wavelengths closer to the plasmonic resonance.

The application of a DC longitudinal magnetic field results in the selective removal of terms from Eq. 12. Only contributions coupling the incident electric fields with the TM-scattered electric fields contribute to a longitudinal magnetization, i.e., $$M_{nl,z} \propto i(E_i \times {}^{TM}E^*_s + {}^{TM}E_s \times E^*_i), \tag{14}$$

where the TM-scattered electric fields ${}^{TM}E_s$ only include the ${}^{TM}B$-coefficient modes [Eq. 4]. We deduce this claim by inspection of Eqs. 2 and 3, knowing that the magnetic longitudinal dipole decomposes into the odd-valued radial and the even-valued polar magnetization vectors [Eq. 13]. The product of two even or two odd-order Legendre polynomials yields an even-ordered Legendre polynomial, the product of an even and odd-ordered Legendre polynomial yields an odd-ordered Legendre polynomial, and multiplication or division by sin e changes the order from even to odd or vice versa.

We also show $M_{nl,z}$ [Eq. 14] on the surface of an 80 nm-diameter gold nanosphere in water, which represents the nanoparticle nonlinear magnetization during the application of a longitudinal magnetic field when illuminated with circularly-polarized light. The magnetization is anti-symmetric in the radial direction and symmetric in the polar direction. Although the magnitude $|M_{nl,z}|$ has decreased by 5% by the removal of terms from Eq. 12, the scattered electric fields have effectively increased in tandem as a result of the applied magnetic field. After applying a longitudinal magnetic field, the incident field strongly couples to TM-scattered electric fields, which are associated with the nanoparticle surface plasmons. The azimuthal surface currents are expected to increase as a result, which is further described in Sec. 5.

The nonlinear photo-induced magnetization shown in this section points to the magnetic forces that may underlie gold nanocolloid crystallization and photo-induced coagulation dynamics. Incident circularly-polarized light produces surface electrical current loops that induce a DC nanoparticle magnetization. Linearly-polarized and unpolarized light also demonstrate a similar—but perhaps more complicated—photo-induced magnetic response.

We conclude this section by illustrating the sign of the longitudinal nonlinear magnetization i.e., sign[$M_{nl,z}$], in the water between the nanoparticles. Evaluation of the nonlinear magnetization in the x-z plane yields a highly corrugated alternating-sign magnetic structure. Our experiments indicate that the interaction between nanoparticles and the role of the aqueous solution are non-negligible. From the Mie nanoparticle surface to the location of an adjacent nanoparticle, the computed magnitude $|M_{nl,z}|$ decreases by $10^{-2}$, which is not insignificant.

The photo-induced magnetic response may further be increased by the polar molecules and the formation of collective modes in the nanocolloid aqueous solution. Vortex flows are predicted in the surrounding matrix, where $M_{nl,z}$ is singularly-valued and strictly zero at the boundaries between positive values and negative values.

Figure 5A:
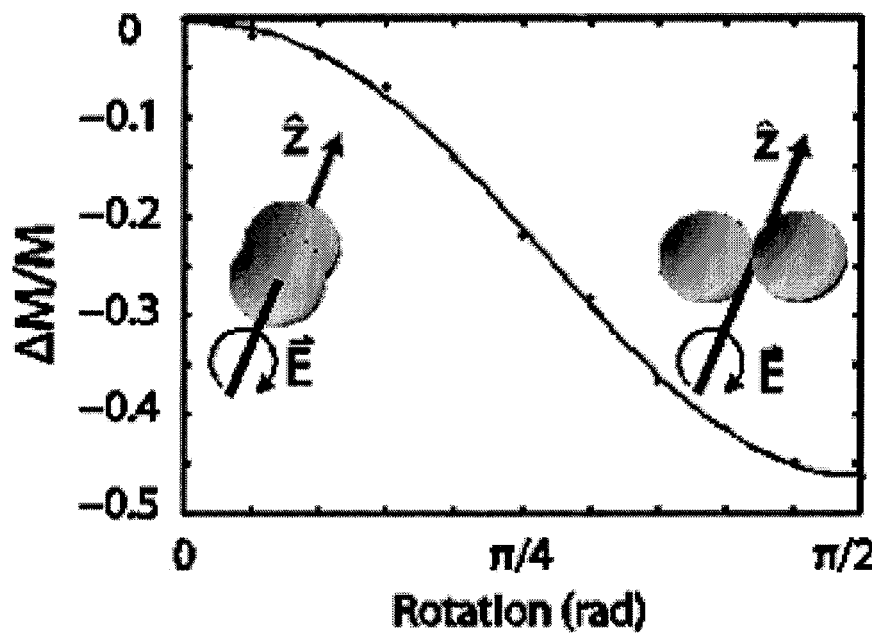
Figure 5B:
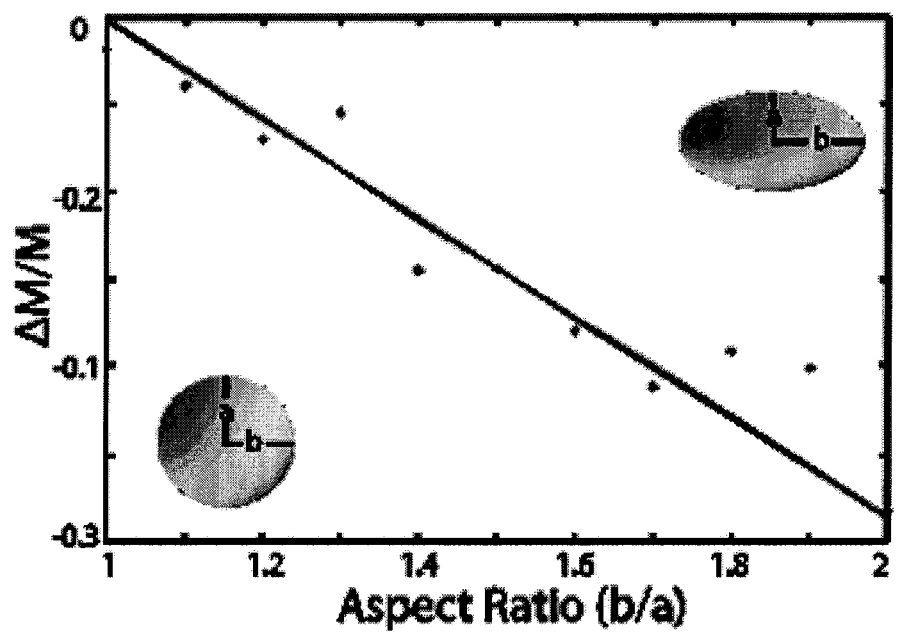
FIG. 5B shows relative change in magnetization from rotation of an ellipsoidal nanoparticle.

Employing this method of alignment, aggregation leads to the production of additional nanomaterials. The aggregation and nanoparticle irregularities simulations have been performed with dimer nanoclusters, (see FIG. 6A) and ellipsoids (see FIG. 6B). FIG. 5A shows that magnetization decreases by almost 50% as the nanocluster rotates from minimal to maximal incident surface area to electric field. Simulations of ellipsoids of different aspect ratios allow us to determine how the anisotropy affects the magnetization of the nanoparticle at various orientations to the incident electric field. FIG. 5B shows the relative change in the magnetization as a function of aspect ratio when rotating ellipsoidal nanoparticles, of equal volume, from minimal to maximal incident surface area. Spheres with aspect ratio 1 exhibit no difference as they are rotated, and greater differences are observed with increasing aspect ratio. FIG. 5B shows good agreement with the Biot-Savart law, where classically the magnetization increases as the incident cross sectional area decreases, indicative of smaller, tighter closed current loops.

We conclude this section by illustrating the sign of the longitudinal nonlinear magnetization i.e., sign[$M_{nl,z}$], in the water between the nanoparticles. Evaluation of the nonlinear magnetization in the x-z plane yields a highly corrugated alternating-sign magnetic structure. Our experiments indicate that the interaction between nanoparticles and the role of the aqueous solution are non-negligible. From the Mie nanoparticle surface to the location of an adjacent nanoparticle, the computed magnitude $|M_{nl,z}|$ decreases by $10^{-2}$, which is not insignificant.

The photo-induced magnetic response may further be increased by the polar molecules and the formation of collective modes in the nanocolloid aqueous solution. Vortex flows are predicted in the surrounding matrix, where $M_{nl,z}$ is singularly-valued and strictly zero at the boundaries between positive values and negative values.

Figures 6A, 6B, 6C, 6D:
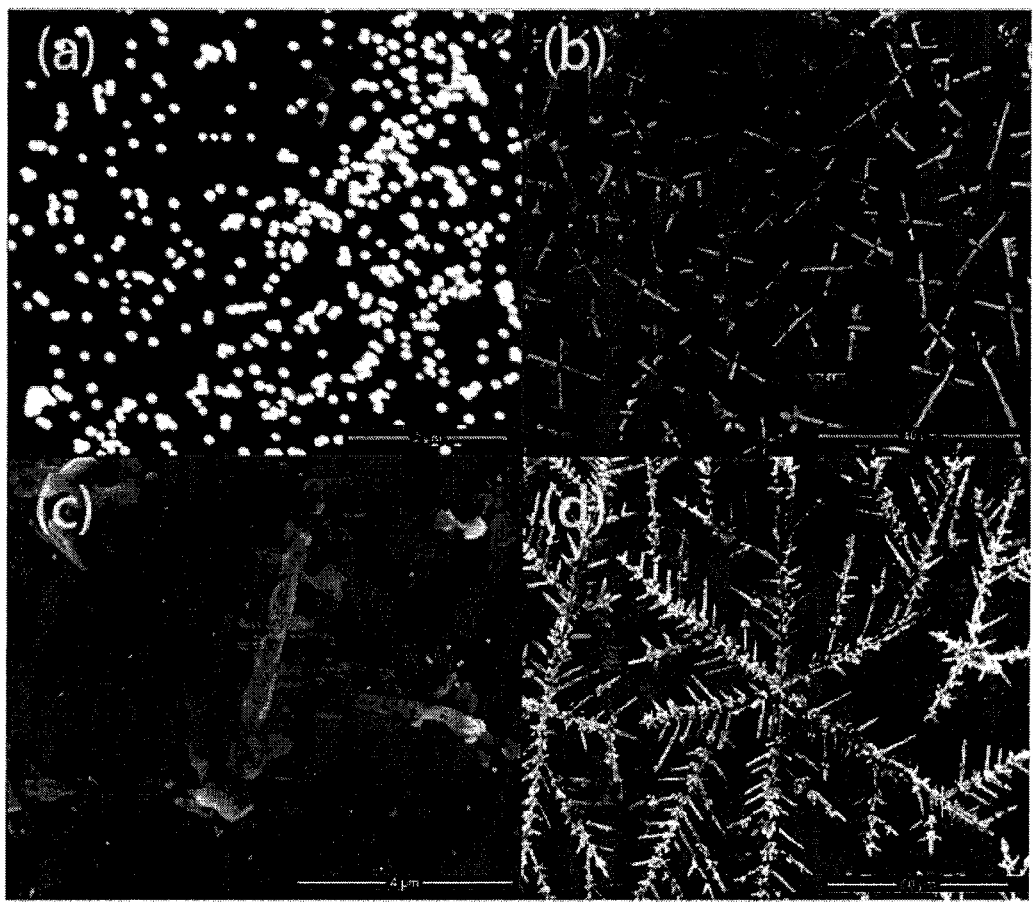

The novel method of fabrication is demonstrated in FIG. 6D where frost-like nanodendritic structures are produced using circularly-polarized light and a pulsed initial magnetic field. The geometry of these nano structures are altered, with branch length and rotational symmetry dependent on intensity and duration of illumination.

In conclusion, we have measured a photo-induced magnetic response of highly-disperse nanocolloids using polarized and unpolarized light. When illuminating samples with a broad-band non-laser light source at sunlight intensities and simultaneously applying mT-strength DC magnetic fields, we observe relative changes in the scattering spectra by as much as 20%. Our analysis indicates that the existence of electrical surface current loops leads to an anisotropic effective conductivity and modified Mie resonances, in agreement with experiments. The associated longitudinal component of the nonlinear magnetization changes sign with incident polarization handedness. Our work points to the significance of observing phase singularities and vortex flows with nanostructured materials; the chiral nonlinear response that we measure and investigate is easily overlooked if one assumes that the photo-induced response from circularly-polarized light is simply a superposition of two orthogonal linear polarizations.

The photo-induced magnetic response is particularly remarkable given the low fill-factor of particles in our solution samples (about $10^{-7}$) and the unprecedented low illumination intensities (less than 1 W per square cm). In one embodiment, the fill-factor of the composite is about $10^{-6}$ or less. The measured trends are repeatable and highly concentration-dependent.

Here, we demonstrate experimentally an anomalously-large and sustained response to DC magnetic fields from solutions of nanospheres. Since the photo-induced magnetic response of individual nanospheres is considered too small to be significant at room temperatures and because the photo-induced magnetic response is sustained by incident light after the applied magnetic field is removed, it is inferred that the role of the surrounding aqueous solution and the interactions between adjacent particles are non-negligible. Here, we have proposed how the nonlinear magnetization in the solution matrix carries an alternating-sign "magnetic structure".

To the best of our knowledge, we provide the first demonstration of a photo-induced plasmon-assisted magnetic response that occurs with non-aggregated non-ferromagnetic metallic nanoparticles and moreover, the first demonstration of any such plasmonic magnetic response using unpolarized incoherent light. Our research builds on prior work aimed at the bottom-up synthesis of 3D metamaterials and highlights the potential for broad-band solar applications with nanocomposites. Our investigation points to new routes for nonlinear optics research with nanostructures and underlines considerations that should be relevant for high-sensitivity force measurements. Finally, our demonstration indicates vast untapped potential of solution-based 3D nanocomposite metamaterials using electrophoretic and external magnetic-field self-assembly techniques.

While the invention has been described with reference to certain embodiments, it will be understood by those skilled in the art that various changes may be made and equivalents may be substituted for elements thereof to adapt to particular situations without departing from the scope of the disclosure. Therefore, it is intended that the claims not be limited to the particular embodiments disclosed, but that the claims will include all embodiments falling within the scope and spirit of the appended claims.

What is claimed is:

1. A method for aligning non-ferromagnetic nanostructures, the method comprising:
   coating a substrate with a solution comprising nonferromagnetic particles in a liquid;
   simultaneously exposing the solution to both circularly-polarized light and a magnetic field so as to align the nonferromagnetic nanoparticles.

2. The method as recited in claim 1, wherein the nonferromagnetic particles have a diameter between about 5 nm and 100 nm.

3. The method as recited in claim 2, wherein the nonferromagnetic particles consists essentially of gold and aggregate during the method.

4. The method as recited in claim 1, wherein the liquid is comprises a hydroxyl group.

5. The method as recited in claim 1, wherein the liquid is comprises a conducting polymer.

6. The method as recited in claim 5, wherein the conducting polymer is poly(3,4-ethylenedioxythiophene).

7. The method as recited in claim 1, wherein the circularly-polarized light has an intensity of from about 10 mW per square centimeter to about 2 W per square centimeter.

8. The method as recited in claim 1, wherein the magnetic field has a strength of from about 10 microtesla to about 900 millitesla.

9. The method as recited in claim 1, wherein the applied magnetic field arises from a ferromagnetic material that is not mechanically fixed to the non-ferromagnetic nanoparticles.

10. A method for dynamically aligning nonferromagnetic nanostructures, the method comprising:

coating a substrate with a solution comprising non-magnetic particles in a liquid;
simultaneously exposing both circularly-polarized light and an applied magnetic field so as to align the non-magnetic particles;
dynamically varying the applied magnetic field or polarization of the circularly-polarized light to realign the non-magnetic particles.

11. The method as recited in claim 10, wherein the liquid comprises a hydroxyl group.

12. The method as recited in claim 10, wherein the liquid comprises a conducting polymer.

13. The method as recited in claim 10, wherein the circularly-polarized light has an intensity of from about 10 mW per square centimeter to about 2 W per square centimeter.

14. The method as recited in claim 10, wherein the applied magnetic field has a strength of from about 10 microtesla to about 900 millitesla.

15. The method as recited in claim 10, wherein the liquid is hydroxyl-group-free.

16. A method for aligning nanostructures, the method comprising:
coating a substrate with a solution comprising nonferromagnetic nanoparticles in a liquid, the nonferromagnetic nanoparticles having a diameter between about 5 nm and about 3 microns;
applying an external magnetic field to the substrate;
exposing the substrate to circularly-polarized light to create an induced magnetic field in the nonferromagnetic nanoparticles;
wherein the step of applying and the step of exposing are performed simultaneously such that the induced magnetic field aligns with the external magnetic field;
permitting the solution to cure while the step of applying and the step of exposing are performed simultaneously.

17. The method as recited in claim 16, wherein the step of permitting the solution to cure permits the liquid to evaporate.

18. The method as recited in claim 16, wherein the circularly-polarized light has peak intensities of from about 1 W per square centimeter to about 2 MW per square centimeter.

19. The method as recited in claim 16, wherein the external magnetic field has a strength of from about 10 microtesla to about 900 millitesla and is pulsed.

20. The method as recited in claim 16, wherein the nonferromagnetic nanoparticles are permitted to aggregate into an organized structure.

* * * * *